UNITED STATES PATENT OFFICE.

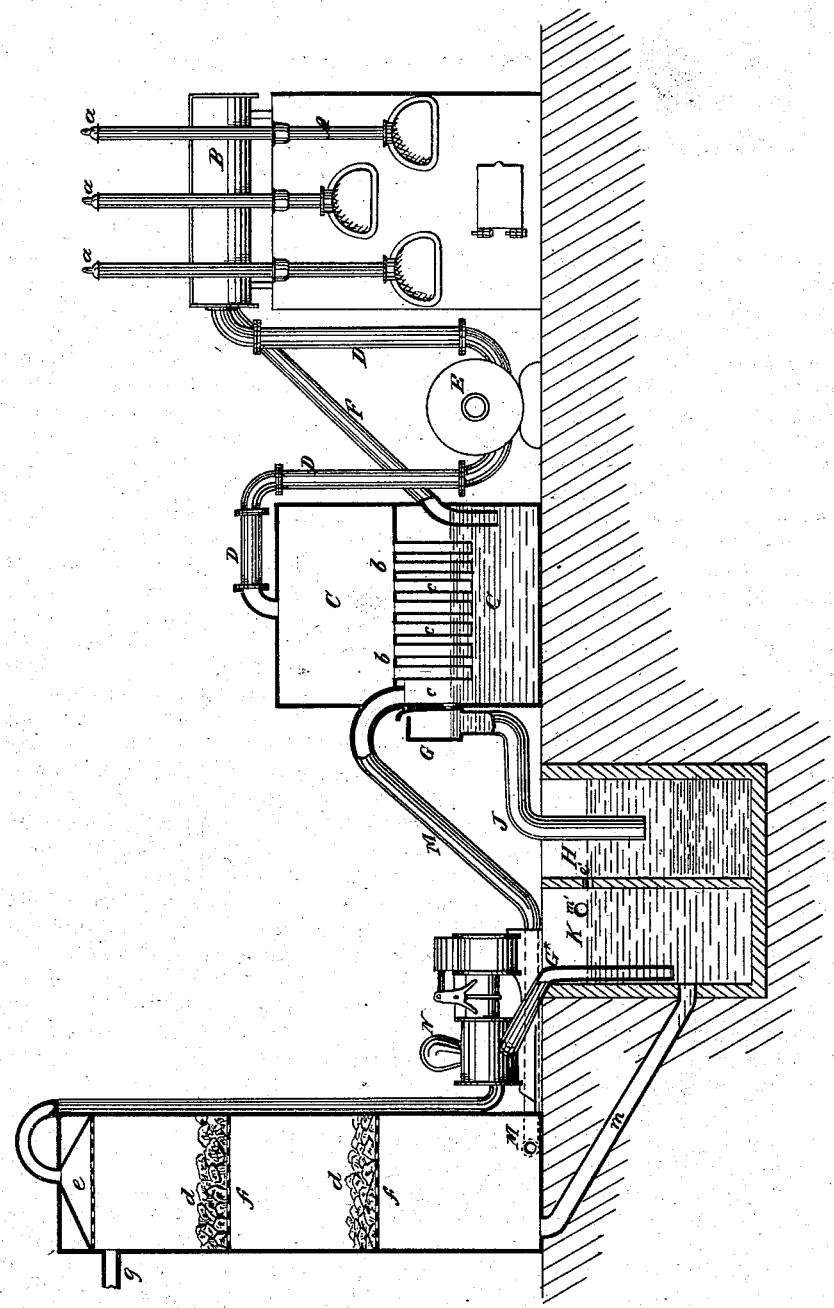

WILLIAM H. ST. JOHN, OF NEW YORK, N. Y.

IMPROVEMENT IN PURIFYING ILLUMINATING-GAS.

Specification forming part of Letters Patent No. 154,351, dated August 25, 1874; application filed February 24, 1874.

*To all whom it may concern:*

Be it known that I, WILLIAM H. ST. JOHN, of the city, county, and State of New York, have invented certain Improvements in the Purification of Illuminating-Gas, of which the following is a specification:

This invention is based upon the discovery that the liquid or "liquor," so called, produced by the destructive distillation of bituminous, oily, and other like gas-producing materials possesses the power of effectually removing deleterious impurities from the illuminating-gas, produced by similar or simultaneous distillation of the same substances, when brought in intimate contact with the said illuminating-gas. The invention consists in the purification of such gas by passing through it, by spraying, percolation, or otherwise, the hereintofore-indicated liquor evolved from the gas-producing material; also, in certain novel combinations of parts, whereby the said process may be successfully carried out in practice.

The drawing represents a front view and partial vertical section of the apparatus.

A is the usual bench of retorts, which may be duplicated to any required extent, and of which B is the hydraulic main, and $a$ the dip-pipes. C is a chamber, divided, by a horizontal partition, $b$, into an upper and lower compartment, and provided with dip-tubes $c$, depending from the partition $b$. A curved pipe, D, extends from the upper part or gas-space of the hydraulic main to the upper compartment of the chamber C. At any desired point in this pipe D is provided an exhauster, E, of the usual or any suitable construction. From the lower portion of the hydraulic main—that is to say, the portion containing the liquid or liquor which seals the dip-pipes $a$—to the lower compartment of the chamber C extends a pipe, F. The liquids produced by the condensation in the hydraulic main of the vapors evolved from the gas-producing material during the distillation of said material, after serving to seal the dip-pipes $a$, flow through the pipe F into the lower compartment of the chamber C, and rise therein to a height sufficient to seal the lower ends of the dip-tubes $c$, as indicated in the drawing, the dip-tubes, with their lower ends thus immersed, providing a hydraulic seal. As the liquor flows into the aforesaid lower part of the chamber C, a portion of that previously contained therein is displaced, and flows out through an outlet-valve, G. This valve is preferably made capable of vertical adjustment, to permit the height of the liquor in the chamber to be regulated, to insure any required depth of seal to the dip-tubes. H is the tar-well, provided at any suitable distance from the chamber C, but between the latter and the scrubber. (Shown at I.) A pipe, J, passes from the valve G to the tar-well, to conduct to the latter the outflow of liquid from the chamber C. Adjacent to the tar-well is the cistern K, with which, near the top, it is connected by a passage, $e$. The tar, by its superior gravity, sinks in the tar-well, leaving, in a comparatively clear condition, the supernatant liquor, which then flows through the passage $e'$ into the cistern. The bottom of the scrubber I is connected, by a pipe, M, with the space between the liquor in the chamber C and the partition $b$ thereof. The scrubber is furnished internally with perforated or slatted shelves $f$, upon which is placed coke, breese, or equivalent material. (Shown at $d$.) In the top of the scrubber is provided the foraminated showering-chamber $e$, from which to the cistern K is extended the pipe G*, the lower end of this pipe preferably dipping nearly to the bottom of the cistern. Connected to this pipe at any suitable point is a pump, N, of any appropriate kind, the said pump operating to draw the liquid contents of the cistern from the latter, and force such liquor to the showering-chamber $e$, whence it descends, in the form of spray, or finely-divided drops, or streams, to the coke or equivalent material placed on the uppermost of the shelves $f$. After percolating through the said material the liquor further descends, in a finely-divided condition, to the material on the shelf below, and finally to the bottom of the scrubber, where it passes off through a suitable outlet-pipe, $m$, back to the cistern K, whence it is again withdrawn and passed through the scrubber, substantially the same volume of the liquor being used over and over again. Any surplus passing to or accumulating in the cistern passes off through an outlet, $m'$, provided to the cistern at any suitable height.

By returning the liquid back from the scrubber to the cistern its entire purifying power is utilized, and the quantity derived from the distillation of a given quantity of coal or equivalent gas-producing material is rendered practically sufficient for the purification of the gas from the same quantity of gas-producing material.

The operation is as follows: The gas, being forced by the exhauster from the hydraulic main through the pipe D, into the upper compartment of the chamber C, passes thence down the dip-tubes $c$, into and through the liquor in the lower part of the chamber. There the tar by the law of cohesion agglomerates, and is thereby separated from the gas. The liquid flowing from the chamber through the pipe J to the well H, the tar settles in the latter, and the clear liquor passes thence into the cistern K, whence it is taken in a continuous stream by the pump N, and forced through the pipe $G^\times$ to the showering-chamber, whence it descends through the scrubber, as heretofore set forth. Meanwhile, the gas as it emerges from the liquor in the chamber C, passes through the pipe M to the bottom of the scrubber, and rising through the latter has its whole volume subjected to the intimate contact and action of the descending liquor, and finally makes its exit through a suitable outlet, $g$. By this means the gas is brought into immediate contact with a large surface of the liquor, and is consequently subjected thoroughly to the action of the said liquor. This action is mainly of a chemical character, the sulphurous acid and the carbonic acid in the crude gas being neutralized and fixed by the ammonia existing in considerable percentage in the liquor, the resultant salts remaining in solution in the liquor, while the gas, freed from the aeriform acid impurities just named, passes out from the apparatus in a state of comparative purity. Moreover, the bisulphide of carbon, refractory to ordinary purifying methods, is dissolved and separated from the gas by the sulphide of ammonium contained in the liquor. Furthermore, the naphthaline held in suspension by the gas as it comes from the hydraulic main, and which has hitherto uniformly caused much trouble by choking pipes, burners, &c., is wholly removed by the solvent action of the coal-oils contained in the liquor, and with which the gas is brought into intimate contact while passing through the chamber C, &c.

It will be seen that the principle of this invention remains the same in whatever manner the liquor be made to pass through the gas. For example, in the scrubber, reliance might be placed wholly upon showering or spraying the ammoniacal liquor through the volume of gas, or in lieu of this, solely upon causing the gas to pass through the interstices of a mass of broken material or coke kept moistened by a constant flow of the liquor thereupon, the essential condition being that the liquor be made to pass through the volume of gas in such a manner as to present an extended surface to the same. It will furthermore be seen that if the pipe $G^\times$ were arranged to take only the clear or supernatant liquor from the tar-well, the operation would remain the same, if the pipe $G^\times$ were made to dip into the said tar-well instead of the cistern, the latter in such cases being dispensed with. But it should be kept in mind that the hydraulic seal constituted by the arrangement of the dip-tubes with reference to the liquor in the chamber C, has an important function in the most efficient carrying out of the process, for the reason that the said seal insures, practically, the separation of the tar from the gas before the gas reaches the scrubber, thereby preventing that clogging of the scrubber with tar, which would otherwise occur. In lieu of the precise construction shown, a single dip-tube or other appropriate equivalent may be used.

What I claim as my invention is—

1. The arrangement of the hydraulic seal between the pipe D and the wet scrubber, whereby the gas is forced from the tar to insure the efficient operation of the scrubber, substantially as herein set forth.

2. Broadly, the within-described process of purifying illuminating gas, by passing through it the liquor derived from the gas-producing material in the manufacture of the gas, substantially as herein set forth.

3. Specifically, the relative arrangement of the tar-well or ammoniacal-liquor cistern of a gas-works, the scrubber of such works, the pipe $G^\times$ and pump N, whereby the liquor is conducted from the tar-well to the scrubber, to exert its purifying action upon the gas, in the manner herein set forth.

4. The combination, with the scrubber and the cistern, of the pipe $m$, whereby the liquor is returned to the cistern after its use in the scrubber, substantially as and for the purpose set forth.

W. H. ST. JOHN.

Witnesses:
W. T. BALLARD,
GEO. H. ST. JOHN.